United States Patent
Shimizu et al.

(10) Patent No.: US 9,519,140 B2
(45) Date of Patent: Dec. 13, 2016

(54) DUST REMOVING DEVICE, MANUFACTURING METHOD FOR SAME, AND IMAGE PICKUP APPARATUS

(71) Applicant: CANON KABUSHIKI KAISHA, Tokyo (JP)

(72) Inventors: Yasushi Shimizu, Fujisawa (JP); Toshihiro Ifuku, Yokohama (JP); Makoto Kubota, Yokohama (JP); Tatsuo Furuta, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/786,148

(22) PCT Filed: Apr. 18, 2014

(86) PCT No.: PCT/JP2014/061804
§ 371 (c)(1),
(2) Date: Oct. 21, 2015

(87) PCT Pub. No.: WO2014/175456
PCT Pub. Date: Oct. 30, 2014

(65) Prior Publication Data
US 2016/0103314 A1    Apr. 14, 2016

(30) Foreign Application Priority Data
Apr. 25, 2013    (JP) .................. 2013-092768

(51) Int. Cl.
*G02B 1/00* (2006.01)
*G02B 27/00* (2006.01)
(Continued)

(52) U.S. Cl.
CPC ........ *G02B 27/0006* (2013.01); *H04N 5/2171* (2013.01); *H04N 5/2254* (2013.01)

(58) Field of Classification Search
CPC ....... G02B 27/0006; H01L 41/18; B08B 7/02; H04N 5/217; H04N 5/2171; H04N 5/2254
(Continued)

(56) References Cited

U.S. PATENT DOCUMENTS

2010/0123786 A1    5/2010  Komada
2011/0262127 A1*  10/2011  Kawai ............... G02B 27/0006
                                                              359/508
2012/0241593 A1    9/2012  Ochi

FOREIGN PATENT DOCUMENTS

EP    2330460 A1    6/2011
EP    2584622 A2    4/2013
(Continued)

*Primary Examiner* — Euncha Cherry
(74) *Attorney, Agent, or Firm* — Canon U.S.A., Inc., IP Division

(57) ABSTRACT

In a dust removing device including a vibration plate, which includes on its surface an optical effective region B having a substantially right-angled quadrate shape and an outer region A, and a piezoelectric element, when a region positioned in one end portion of the piezoelectric element in a direction along a side O of the piezoelectric element and spanning along the side P over a length b inwards from a line, which is an extension of a side N, N' of the optical effective region B and which intersects the piezoelectric element, is denoted by an near-end zone σ of the piezoelectric element, an absolute value of piezoelectric constant of the piezoelectric material in a region not including the near-end zone σ, is denoted by d, and an absolute value of the piezoelectric constant in the near-end zone σ is denoted by $d_0$, relation of $d > d_0$ is satisfied.

6 Claims, 5 Drawing Sheets

(51) Int. Cl.
*H04N 5/217* (2011.01)
*H04N 5/225* (2006.01)

(58) Field of Classification Search
USPC .................................................. 359/507, 508
See application file for complete search history.

(56) References Cited

FOREIGN PATENT DOCUMENTS

| | | |
|---|---|---|
| JP | 2008-227867 A | 9/2008 |
| JP | 2009-159268 A | 7/2009 |
| JP | 4871802 B2 | 2/2012 |

\* cited by examiner

FIRST ELECTRODE SURFACE    SECTION ALONG IIIA–IIIA'    SECOND ELECTRODE SURFACE

SECTION ALONG
IVB–IVB'

DUST REMOVING DEVICE, MANUFACTURING METHOD FOR SAME, AND IMAGE PICKUP APPARATUS

TECHNICAL FIELD

The present invention relates to a dust removing device, a manufacturing method for the dust removing device, and an image pickup apparatus. More particularly, the present invention relates to a dust removing device for removing, by vibration, foreign matter, such as dust, which adheres to the surface of an optical component incorporated in an image pickup apparatus, such as a digital camera, or in an image reading apparatus, such as a scanner, to a manufacturing method for the dust removing device, and to an image pickup apparatus including the dust removing device.

BACKGROUND ART

In an image pickup apparatus, such as a digital camera, which takes an image through conversion of an image signal to an electric signal, a beam of light from an object to be photographed is received by an image pickup element, such as a Charge Coupled Device (CCD) sensor or a Complementary Metal Oxide Semiconductor (CMOS) sensor. The signal after the photoelectric conversion, output from the image pickup element, is converted to image data and is recorded on a recording medium, such as a memory card. In the above-mentioned image pickup apparatus, a cover glass, an optical low-pass filter, an infrared absorption filter, etc. are arranged on the front side (i.e., the side nearer to the object) of the image pickup element.

In that type of image pickup apparatus, if foreign matter, such as dust, adheres to the surface of the cover glass or the filter of the image pickup element, incident light may be intercepted by the foreign matter, and the foreign matter may be captured as a black point in a photographed image. In a single-lens reflex camera, particularly, there is a possibility that dust may generate when mechanically operating members, such as a shutter and a quick return mirror, arranged near an image pickup unit are operated, and that dust may enter the camera through a lens mount opening when a lens is exchanged. Those dusts may adhere to the surface of the cover glass or the filter of the image pickup element. In view of the above situation, an image pickup apparatus and an image reading apparatus, each provided with a dust removing device to remove dust adhering to the surface of an optical component, are proposed in which a piezoelectric element is disposed on a cover glass or a filter of an image pickup element, and the cover glass or the filter of the image pickup element is bent to displace in the direction of thickness thereof by utilizing vibration of the piezoelectric element, thus causing the dust to be detached from the surface and to be flipped away with out-of-plane vibration (called "flexural vibration" hereinafter) (see Patent Literatures (PTLs) 1 and 2).

PTLs 1 and 2 each discloses a device in which a piezoelectric element is arranged outside an optical effective region of a rectangular optical filter (e.g., a low-pass filter or an infrared absorption filter) along an edge of the optical effective region, and dust adhering to the surface of the optical effective region is removed with vibration of the piezoelectric element.

CITATION LIST

Patent Literature

PTL 1 Japanese Patent Laid-Open No. 2008-227867
PTL 2 Japanese Patent No. 4871802

SUMMARY OF INVENTION

Technical Problem

However, some part of dusts having being scattered or dropped from the surface of a vibration plate by the dust removing device may repeat adhesion to the surface of the vibration plate by the action of electrostatic force. Thus, the dust having adhered to the surface of the vibration plate again may intercept the incident light and may be captured as a black point in the photographed image again.

In view of the problems described above, the present invention provides a dust removing device that can satisfactorily remove dust adhering to an optical effective region of a vibration plate, and a manufacturing method for the dust removing device. The present invention further provides an image pickup apparatus that can take a good image by employing the dust removing device.

Solution to Problem

More specifically, the present invention provides a dust removing device including at least a vibration plate and one or more piezoelectric elements disposed on a surface of the vibration plate, wherein the surface of the vibration plate includes at least an optical effective region B having a substantially right-angled quadrate shape and an outer region A positioned outside the optical effective region B, wherein the piezoelectric element includes a substantially rectangular parallelepiped piezoelectric material, and at least a first electrode and a second electrode disposed on surfaces of the piezoelectric material to face each other, wherein given that four sides of the optical effective region B are denoted by a pair of sides O and O' and a pair of sides N and N' perpendicular to the pair of sides O and O', a side P of the piezoelectric element in a lengthwise direction thereof is disposed along the side O, and wherein given that a length of a part of the side P of the piezoelectric element where the first electrode and the second electrode face each other is denoted by PL, a length of one side of the vibration plate in the direction along the side O is denoted by VL, a length of the side O of the optical effective region B is denoted by OL, a region positioned in one end portion of the piezoelectric element 30 in a direction along the side O and spanning along the side P over a length b inwards from a line, which is an extension of the side N or N' of the optical effective region B and which intersects the piezoelectric element, is denoted by an near-end zone σ of the piezoelectric element, an absolute value of piezoelectric constant of the piezoelectric material in a region, which is positioned between two lines extending from the sides N and N' of the optical effective region B and which does not include the near-end zone σ, is denoted by d, and an absolute value of the piezoelectric constant in the near-end zone σ is denoted by $d_0$, relations of VL≥PL>OL and d>$d_0$ are satisfied, and the length b satisfies a relation of OL>b>0.

The present invention further provides a manufacturing method for a dust removing device including at least a vibration plate that includes, in a surface thereof, at least an optical effective region B having a substantially right-angled quadrate shape and an outer region A positioned outside the optical effective region B, and one or more piezoelectric elements each having a substantially rectangular parallelepiped shape and disposed on the surface of the vibration plate, the piezoelectric element including a piezoelectric material, a first electrode, and a second electrode, wherein the manufacturing method includes steps of fixing each piezoelectric element to the outer region A positioned outside the optical effective region B of the vibration plate such that, when four sides of the optical effective region B are denoted by a pair of sides O and O' and a pair of sides N and N' perpendicular to the pair of sides O and O', a side P of the piezoelectric element in a lengthwise direction thereof is disposed along the side O; specifying, as an near-end zone σ of the piezoelectric element, a region positioned in one end portion of the piezoelectric element in a direction along the side O and spanning along the side P over a length b inwards from a line, which is an extension of the side N or N' of the optical effective region B and which intersects the piezoelectric element; and heat press-bonding an electric supply line, through which an AC voltage is supplied to the piezoelectric element, to the near-end zone σ while a relation of $d > d_0$ is satisfied where d denotes an absolute value of piezoelectric constant of the piezoelectric material in a region other than the near-end zone σ, and $d_0$ denotes an absolute value of the piezoelectric constant in the near-end zone σ.

The present invention still further provides an image pickup apparatus including at least the above-described dust removing device and an image pickup element, wherein the vibration plate of the dust removing device and a light receiving surface of the image pickup element are disposed in coaxial relation.

Further features of the present invention will become apparent from the following description of exemplary embodiments with reference to the attached drawings.

DESCRIPTION OF EMBODIMENTS

First, a dust removing device according to will be described in detail below.

Figure 1:
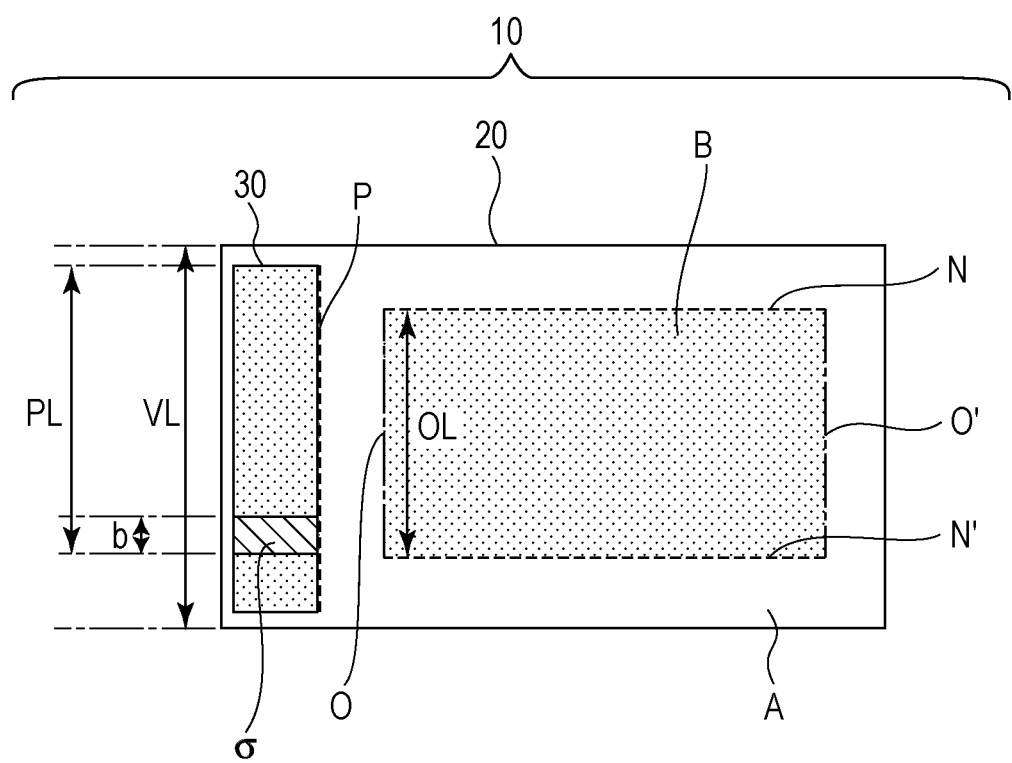
FIG. 1 illustrates one example of a dust removing device according to an embodiment of the present invention when observed from a direction of an optical axis.

FIG. 1 illustrates one example of the dust removing device according to an embodiment of the present invention when observed from a direction of an optical axis.

The dust removing device according to the embodiment of the present invention includes at least a vibration plate 20 and one or more piezoelectric elements 30 disposed on a surface of the vibration plate 20. The surface of the vibration plate 20 includes at least an optical effective region B having a substantially right-angled quadrate shape and an outer region A positioned outside the optical effective region B. The piezoelectric element 30 includes a substantially rectangular parallelepiped piezoelectric material 31, and at least a first electrode 32 and a second electrode 33 disposed on surfaces of the piezoelectric material 31 to face each other. Given that four sides of the optical effective region B are denoted by a pair of sides O and O' and a pair of sides N and N' perpendicular to the pair of sides O and O', a side P of the piezoelectric element 30 in a lengthwise direction thereof is disposed along the side O. Given that a length of a part of the side P of the piezoelectric element 30 where the first electrode 32 and the second electrode 33 face each other is denoted by PL, a length of one side of the vibration plate 20 in a direction along the side O is denoted by VL, a length of the side O is denoted by OL, a region positioned in one end portion of the piezoelectric element 30 in the direction along the side O and spanning along the side P over a length b inwards from a line, which is an extension of the side N or N' of the optical effective region B and which intersects the piezoelectric element 30, is denoted by an near-end zone σ of the piezoelectric element, an absolute value of piezoelectric constant of the piezoelectric material 31 in a region, which is positioned between two lines extending from the sides N and N' of the optical effective region B and which does not include the near-end zone σ, is denoted by d, and an absolute value of the piezoelectric constant in the near-end zone σ is denoted by $d_0$, relations of VL≥PL>OL and $d > d_0$ are satisfied, and the length b satisfies a relation of OL>b>0.

The embodiment of the present invention is able to provide the dust removing device and an image pickup apparatus wherein an image can be taken in good quality by trapping dust adhering to the optical effective region in the surface of the vibration plate, which region corresponds to the image pickup element, in a zone positioned outside the optical effective region in the surface of the vibration plate and vibrating with a small amplitude without scattering the dust toward other components than the vibration plate inside a camera and into air, thereby suppressing the dust, which has scattered or dropped from the surface of the vibration plate, from adhering to the optical effective region again, and preventing the dust from being captured by an image pickup element.

The dust removing device according to the embodiment of the present invention includes at least the vibration plate 20 and one or more piezoelectric elements 30 disposed on the surface of the vibration plate 20. When the piezoelectric element 30 is disposed on the surface of the vibration plate 20, stress can be generated between the piezoelectric element 30 and the vibration plate 20, and the flexural vibration can be generated in the vibration plate 20 by driving the piezoelectric element 30 with application of an AC voltage to the piezoelectric element 30.

The vibration plate 20 of the dust removing device 10 according to the embodiment of the present invention is a plate member having a substantially rectangular parallelepiped shape. A material of the vibration plate 20 is not limited to particular one. However, when the dust removing device 10 is used in optical fields, the vibration plate 20 is desirably formed of a transparent member or a reflective member, such as an optical filter (e.g., a low-pass filter or an infrared absorption filter).

A surface of the vibration plate 20 includes the optical effective region B having the substantially right-angled quadrate shape, and the outer region A positioned outside the optical effective region B.

The optical effective region B implies a region that is a part of the surface of the vibration plate 20 where dust is to be removed from there. When the vibration plate 20 is combined with an image pickup element 40, for example, the optical effective region B implies such a region that, if dust exists in the region, the dust is captured by the image pickup element 40, and that light incident upon the image pickup element 40 passes through the region perpendicularly.

The outer region A implies a region that is positioned on the same surface of the vibration plate 20 as occupied by the optical effective region B, and that is a part of the surface of the vibration plate 20, the part not including the optical effective region B. Because the outer region A does not include the optical effective region B, dust trapped in the outer region A can be kept from intercepting the light passing through the optical effective region B when the vibration plate 20 is combined with the image pickup element 40, for example. Furthermore, because the outer region A is positioned outside the optical effective region B, the optical effective region B can be formed as a maximally larger region in a central portion of the vibration plate 20.

Here, the expression "substantially right-angled quadrate shape" is not limited to a square or rectangular shape, and it includes a shape basically made up of four sides and having rounded corners of a right-angled quadrangle, or a shape in which angles formed by intersecting sides of a quadrangle are slightly deviated from 90°, or an actually polygonal shape obtained by obliquely cutting corners of a right-angled quadrangle.

The dust removing device 10 according to the embodiment of the present invention operates as follows. By driving the piezoelectric element 30, the dust adhering to the vibration plate 20 is removed from the optical effective region B (i.e., the region surrounded by the four sides O, O', N and N' in FIG. 1) with the flexural vibration generated in the vibration plate 20, and the dust is trapped in the outer region A of the vibration plate 20.

The piezoelectric element 30 is fixed to the vibration plate 20. The piezoelectric element 30 is desirably fixed to an end portion of the vibration plate 20 such that the optical effective region B can be secured as a maximally larger region even when the vibration plate 20 having a relatively small size is employed. The expression "fix", "install", and "dispose" used in this Description does not always implies a contact state of two members. Thus, a resin used as, e.g., an adhesive, an insulating material, or a metallic material may be interposed between the two members as required. The piezoelectric element 30 preferably has a thickness of 1000 μm or less and more preferably 100 μm or more and 500 μm or less. If the thickness is larger than 1000 μm, expansion and contraction of the piezoelectric element 30 would be less transmittable to the vibration plate 20. When the thickness is 100 μm or more, the piezoelectric element 30 has sufficient strength and can be handled conveniently. Thus, such a range of the thickness is more preferable.

The vibration plate 20 and the piezoelectric element 30 each have the substantially parallelepiped shape, and the optical effective region B has the substantially right-angled quadrate shape. Here, one side of each of the vibration plate 20 and the piezoelectric element 30 having the substantially rectangular parallelepiped shape is desirably parallel to one side of the optical effective region B having the substantially right-angled quadrate shape. A deviation of each of those sides from parallelism is preferably within 10°. By arranging the piezoelectric element 30, the vibration plate 20, and the optical effective region B as described above, the optical effective region B can be formed as a maximally larger region. The piezoelectric element 30 may be fixed to the same surface of the vibration plate 20 in which the optical effective region B is formed, or an opposite surface of the vibration plate 20 to the surface in which the optical effective region B is formed. Furthermore, the piezoelectric element 30 may be disposed plural. For example, though not illustrated, a pair of piezoelectric elements 30 may be fixed to the vibration plate 20 on both sides of the optical effective region B at substantially symmetrical positions, or plural piezoelectric elements 30 may be fixed side by side. When the piezoelectric element 30 is disposed plural, the number of piezoelectric elements 30 is preferably five or less. If the number of piezoelectric elements 30 is six or more, a manufacturing process is complicated and a manufacturing cost is increased.

Here, the expression "substantially rectangular parallelepiped shape" is not limited to a hexahedron in which all surfaces are rectangles. Thus, the vibration plate 20 and the piezoelectric element 30 are each basically made up of six surfaces and desirably in the form of a plate. The plate may have a shape having corners that are cut or rounded.

As illustrated in FIG. 1, the side O implies one of the four sides of the optical effective region B having the substantially right-angled quadrate shape, which is positioned closest to the piezoelectric element 30 having the substantially rectangular parallelepiped shape. The length VL of one side of the vibration plate 20 extending in a direction along the side O implies a length of one of sides of the vibration plate 20 having the substantially rectangular parallelepiped shape, which is parallel to the side O.

One example of the piezoelectric element used in the embodiment of the present invention, i.e., the piezoelectric element 30 illustrated in FIG. 2, will be described in detail below.

Figure 2:
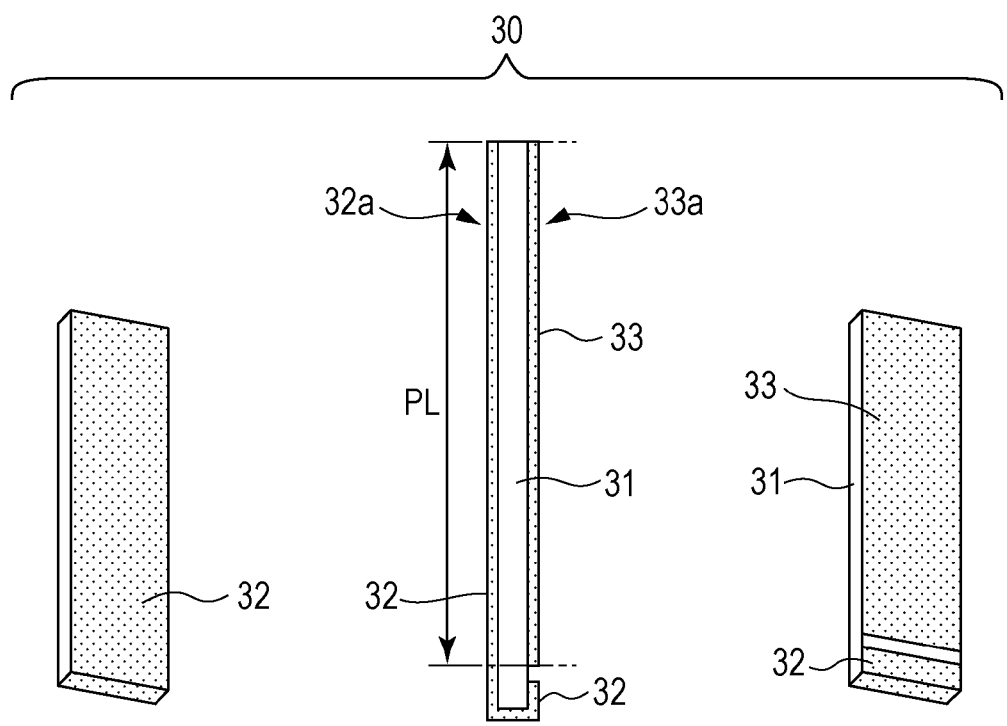
FIG. 2 illustrates one example of a piezoelectric element used in the embodiment of the present invention.

FIG. 2 illustrates one example of the piezoelectric element 30 used in the embodiment of the present invention. The piezoelectric element 30 is constituted by the piezoelectric material 31, the first electrode 32, and the second electrode 33. As illustrated in FIG. 2, the first electrode 32 and the second electrode 33 are arranged to face each other with the piezoelectric material 31 interposed therebetween over a range of the length PL of a portion of the piezoelectric element 30 where the first electrode 32 and the second electrode 33 face each other. In other words, a length, taken in the direction along the side O, of a part of a region resulting from projecting the second electrode 33 in a direction perpendicular to a surface thereof, the part being overlapped with the first electrode 32, is denoted by PL. Here, in a zone outside the range of PL, the first electrode 32 may extend, for example, up to the side where the second electrode 33 is disposed, as illustrated in FIG. 2. When the first electrode 32 on a first electrode surface and the first electrode 32 on a second electrode surface 33a are in a state electrically connected to each other, the first electrode 32 can be kept at the same potential at any points. With the above-described arrangement, therefore, the AC voltage can be supplied from the side including the second electrode surface 33a.

As illustrated in FIG. 1, the side P of the piezoelectric element 30 implies one of sides of the piezoelectric element 30 having the substantially rectangular parallelepiped shape, which is positioned closest to the optical effective region B having the substantially right-angled quadrate shape. Furthermore, as illustrated in FIG. 1, the length b implies a length measured from, as a start point, a position at which an extension of the side N or N' intersects the side P in a direction toward the inner side of the optical effective region B having the substantially right-angled quadrate shape along the side P, i.e., in a direction oppositely away from the outer area A in contact with the side N or N' along the side P. Moreover, as illustrated in FIG. 1, the near-end zone σ implies a region of the piezoelectric element 30, the region spanning over the length b from a line, which is an extension of the side N or N' of the optical effective region B and which intersects the piezoelectric element 30.

In the embodiment of the present invention, VL and PL satisfy a relation of VL≥PL. If PL of the piezoelectric element 30 is longer than VL of the vibration plate 20, there would be a possibility that, with driving of the piezoelectric element 30, the piezoelectric element 30 is cracked and damaged in its portion in contact with the side of the vibration plate 20. For that reason, PL is set to be not longer than VL.

In the embodiment of the present invention, PL and OL satisfy a relation of PL>OL. In the piezoelectric element 30 used in the embodiment of the present invention, the first electrode 32 and the second electrode 33 are in a state not sandwiching the piezoelectric material 31 therebetween in its region corresponding to a part of the side P of the piezoelectric element 30, the part being not included in PL. Therefore, the AC voltage cannot be applied to the region of the piezoelectric element 30 where the piezoelectric material 31 is contacted with the first electrode 32 along the above-mentioned part of the side P not included in PL. Thus, an inverse piezoelectric effect does not occur in the piezoelectric material 31 in the above-mentioned region where the piezoelectric material 31 is contacted with the first electrode 32 along the above-mentioned part of the side P not included in PL.

The dust removing capability in an arbitrary portion of the optical effective region B is mainly dominated by local piezoelectric performance of the piezoelectric material 31 at a local position of the piezoelectric element 30 on a line extending from the arbitrary portion parallel to the sides N and N' and intersecting the piezoelectric element 30 (i.e., at a position of the piezoelectric element 30 corresponding to the arbitrary portion of the optical effective region B). Therefore, under the condition of PL>OL, the flexural vibration of the vibration plate 20 generated in the optical effective region B can be held at a large magnitude.

The piezoelectric constant of the piezoelectric material 31 used in the embodiment of the present invention satisfies a relation of $d>d_0$ where d is an absolute value of the piezoelectric constant of the piezoelectric material 31 other than the near-end zone σ, and $d_0$ is an absolute value of the piezoelectric constant in the near-end zone σ.

In a dust removing device of related art, some part of dusts adhering to the surface of the vibration plate is scattered from the surface of the vibration plate with the flexural vibration thereof, while most part of the dusts is shifted along the surface of the vibration plate from a place where the flexural vibration is relatively large to a place where the flexural vibration is relatively small, and they are dropped from the vibration plate. Some part of the scattered or dropped dust repeats adhesion to the optical effective region in the surface of the vibration plate by the action of electrostatic force.

The dust removing capability in an arbitrary portion of the optical effective region B is mainly dominated by the piezoelectric performance at a local position of the piezoelectric element 30 on a line extending from the arbitrary portion parallel to the sides N and N' and intersecting the piezoelectric element 30 (i.e., at a position of the piezoelectric element 30 corresponding to the arbitrary portion of the optical effective region B). Thus, in the embodiment of the present invention, since the dielectric constant of the piezoelectric material 31 satisfies the relation of $d>d_0$, the flexural vibration at a position in the optical effective region B corresponding to the length b is smaller than that at a position in the optical effective region B not corresponding to the length b. As a result, the dust adhering to the optical effective region B is shifted to the position in the optical effective region B corresponding to the length b.

Here, as illustrated in FIG. 2, the piezoelectric constant of the piezoelectric material 31 in the region of the piezoelectric element 30 other than the range of PL is very small or 0. Accordingly, the dust having been shifted to the position in the optical effective region B corresponding to the length b is further shifted to the outer region A. However, since the dielectric constant of the piezoelectric material 31 satisfies the relation of $d>d_0$, a difference in magnitude of the flexural vibration between the position in the optical effective region B corresponding to the length b and the position the outer region A is small. Therefore, the shift of the dust toward the outer region A is slowed down to such an extent that the dust remains in the outer region A. Because the dust remaining in the outer region A is attached to the vibration plate 20 by the action of electrostatic force, the dust does not drop from the vibration plate 20.

The length b satisfies a relation of OL>b>0. For example, if $d_0$ is very small or 0, or if the length b is very long, the dust would remain at the position in the optical effective region B corresponding to the length b in some cases. For that reason, when $d_0$ is very small or 0, the length b is desirably set to a smaller value. However, $d_0$ may be reduced or the length b may be increased insofar as, even when the dust remains at the position in the optical effective region B corresponding to the length b, a ratio of the amount of the remaining dust to the amount of the dust, which is some part of the dusts having been scattered or dropped from the vibration plate 20 and which is attached to the surface of the vibration plate 20 again by the action of electrostatic force, reduces. In the dust removing device 10 according to the embodiment of the present invention, as described above, insofar as the flexural vibration at the position in the optical effective region B corresponding to the length b is smaller than that at the position in the optical effective region B not corresponding to the length b, large part of the dusts in the optical effective region B can be trapped in the outer region A, and a dust removal rate of the dust removing device 10 can be increased.

The piezoelectric constant of the piezoelectric material 31 used in the embodiment of the present invention can be determined through calculation in conformity with the standard (JEITA EM-4501), stipulated by Japan Electronics and Information Technology Association, from measurement results of a resonance frequency and an anti-resonance frequency, which are measured using a commercially available impedance analyzer. Such a measurement method is called a resonance-anti-resonance method hereinafter.

The absolute value $d_0$ of piezoelectric constant of the piezoelectric material 31 in the near-end zone σ of the piezoelectric element 30 used in the embodiment of the present invention and the absolute value d of piezoelectric constant of the piezoelectric material 31 other than the near-end zone σ can be determined by cutting respective regions of the piezoelectric material 31, in which those absolute values of the piezoelectric constant are to be measured, into shapes in conformity with the standard (JEITA EM-4501), stipulated by Japan Electronics and Information Technology Association, thus preparing samples for measurement, and by measuring respective local piezoelectric constants of the piezoelectric material 31.

In the embodiment of the present invention, the absolute values d and $d_0$ of piezoelectric constant of the piezoelectric material 31 are each desirably an absolute value of a piezoelectric characteristic component $d_{31}$ that is measured by the resonance-anti-resonance method. The dust removing device 10 is a device for removing the dust adhering to the surface of the vibration plate 20 by the piezoelectric element 30 that drives the vibration plate 20 to cause the flexural vibration. The magnitude of the flexural vibration is closely related to the magnitude of a piezoelectric displacement, which is attributable to the piezoelectric constant $d_{31}$ of the piezoelectric material 31.

However, the piezoelectric element 30 used in the dust removing device 10 according to the embodiment of the present invention is not always required to utilize stretching vibration in the lengthwise direction of the piezoelectric element 30. For example, stretching vibration in the direction of thickness of the piezoelectric element 30, or thickness shear vibration thereof may also be utilized. Therefore, the absolute value of piezoelectric constant of the piezoelectric material 31 is not limited to an absolute value of $d_{31}$, and it may be an absolute value of $d_{33}$ or an absolute value of $d_{15}$. The absolute value of $d_{33}$ or the absolute value of $d_{15}$ can be provided as an absolute value of the piezoelectric characteristic component $d_{33}$ or an absolute value of $d_{15}$, which are measured by the resonance-anti-resonance method as with the absolute value of $d_{31}$. The absolute value of $d_{33}$ can also be evaluated using a $d_{33}$ meter (Piezo Meter System: made by PIEZO TEST Co.)

Furthermore, in the dust removing device according to the embodiment of the present invention, $0 \leq d_0 \leq 0.95d$ is satisfied. More preferably, $0 \leq d_0 \leq 0.90d$ is satisfied.

In the case of $d_0 > 0.95d$, large part of dusts tends to drop from the vibration plate 20 without remaining in the outer region A. The dust adhering to the optical effective region B is flipped away from there with the flexural vibration, or is moved from a zone where dust vibration is large to a zone where dust vibration is small. When $d_0 < 0.95d$ is satisfied, the dust is moved from the zone of d to the zone of $d_0$, and is further moved to the outer region A. Because the vibration of the vibration plate 20 is reduced stepwisely from d to $d_0$, the dust having reached the outer region A tends to remain in the outer region A without being flipped away outward from the outer region A. Accordingly, when $d_0 < 0.90d$ is satisfied, the effect of the flexural vibration is significant. More preferably, $d_0 < 0.5d$ is satisfied.

Moreover, in the dust removing device according to the embodiment of the present invention, a relation of 0.1× OL>b>0 is preferably satisfied. More preferably, 0.05× OL>b>0 is satisfied. When 0.1×OL>b is satisfied, the dust can be kept remained in the outer region A even with $d_0$ being very small or 0. In the case of 0.1×OL>b, $d_0=0$ is allowed, but $d_0>0.1d$ is preferably satisfied.

While the piezoelectric element 30 may be disposed plural as mentioned above, the piezoelectric material 31 constituting one piezoelectric element 30 is desirably formed of one piece of piezoelectric material. The expression "one piece of piezoelectric material" implies a ceramic-like piezoelectric material, which is produced by simultaneously firing starting materials with specific compositions, which have a uniform composition, and which has no seam. If there is a seam, there would be a possibility that stress concentration occurs starting from the seam and the piezoelectric element 30 breaks during driving. Stated in another way, the piezoelectric constant of the piezoelectric material 31 used in the embodiment of the present invention implies the piezoelectric constant in a certain portion of one piece of piezoelectric material.

The first electrode 32 and the second electrode 33 are each formed as a conductive layer having a thickness of about 5 nm to 2000 nm. A material of each electrode is not limited to particular one, and materials used in ordinary piezoelectric elements can be optionally employed. Examples of those materials include metals, such as Ti, Pt, Ta, Ir, Sr, In, Sn, Au, Al, Fe, Cr, Ni, Pd, Ag and Cu, and compounds of those metals.

Figure 3A:
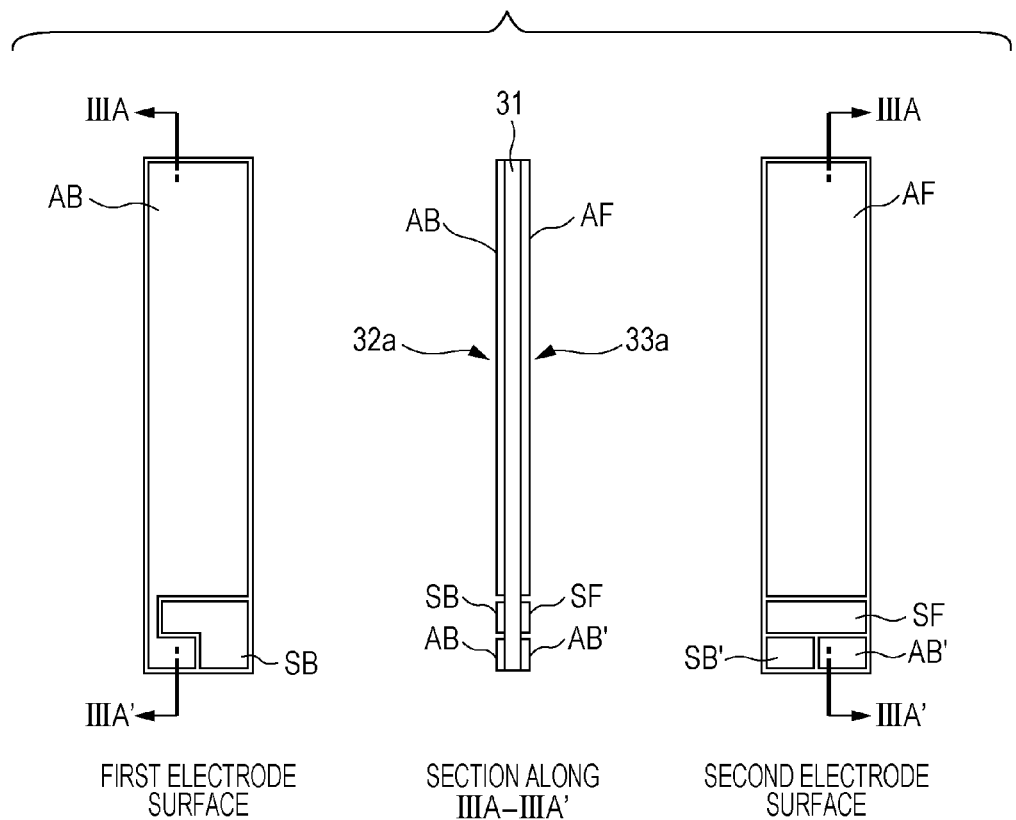
FIGS. 3A and 3B illustrate another example of the piezoelectric element used in the embodiment of the present invention.
Figure 3B:
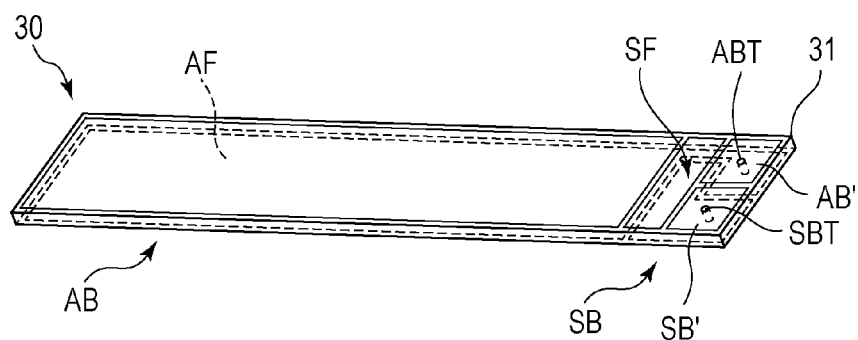

The first electrode 32 and the second electrode 33 may be each formed as a single layer made of one selected from the above-mentioned materials, or as multiple layers made of two or more selected from the above-mentioned materials. The first electrode 32 and the second electrode 33 may be made of different materials. One example of the piezoelectric element used in the embodiment of the present invention, i.e., the piezoelectric element 30 illustrated in FIGS. 3A and 3B, will be described in detail below. In FIGS. 3A and 3B, AB denotes an excitation electrode, AF denotes an excitation electrode, and AB' denotes an excitation electrode. ABT denotes an excitation electrode through-hole, SB denotes a ground electrode, SF denotes a vibration detection electrode, SB' denotes a ground electrode, and SBT denotes a ground electrode through-hole. Because SB and SB' are electrically connected to each other via the through-hole SBT, SB and SB' are held at the same potential.

The piezoelectric element 30 used in the embodiment of the present invention may include a detection phase. FIGS. 3A and 3B illustrate, as one example of the piezoelectric element used in the embodiment of the present invention, the piezoelectric element 30 including the detection phase. The detection phase is constituted by a portion of the piezoelectric material 31 where SF and SB are positioned to face each other, and it exhibits piezoelectricity. The detection phase has the function of monitoring a positive piezoelectric effect, that occurs in the portion of the piezoelectric material 31 sandwiched between the ground electrode SB and the vibration detection electrode SF by the flexural vibration generated in the vibration plate 20, in terms of a change in voltage generated between the ground electrode SB and the vibration detection electrode SF. With the piezoelectric element 30 including the detection phase, a vibration state can be fed back to vibration conditions, or a failure can be detected. It is hence possible to enhance the dust removing performance of the dust removing device 10, or to notify a user of the failure.

From the viewpoint of more efficiently detecting the flexural vibration generated in the vibration plate 20, the detection phase desirably has a substantially rectangular shape in which a direction perpendicular to the side P provides a lengthwise direction.

The piezoelectric element 30 illustrated in FIGS. 3A and 3B will be described in more detail below.

FIG. 3A illustrates a first electrode surface 32a, a second electrode surface 33a, and a lateral surface of the piezoelectric element 30. FIG. 3B is a perspective view when looked at from a direction viewing the second electrode surface 33a. The piezoelectric element 30 is constituted by the piezoelectric material 31, six electrodes disposed thereon, the excitation electrode through-hole ABT, and the ground electrode through-hole SBT, the six electrodes being the excitation electrode AF, the excitation electrode AB, the vibration detection electrode SF, the ground electrode SB, the excitation electrode AB', and the ground electrode SB'.

The piezoelectric element 30, illustrated in FIGS. 3A and 3B, can constitute the dust removing device by employing the piezoelectric element 30 in a similar positional relation to that in the case including the piezoelectric element 30 illustrated in FIG. 2 with respect to the vibration plate 20 and other peripheral configurations.

Comparing the piezoelectric element 30 illustrated in FIGS. 3A and 3B and the piezoelectric element 30 illustrated in FIG. 2 with each other, the excitation electrode AF corresponds to the second electrode 33 on the second electrode surface 33a, the excitation electrode AB corresponds to the first electrode 32 on the first electrode surface 32a, and the excitation electrode AB' corresponds to the first electrode 32 on the second electrode surface 33a. Furthermore, the excitation electrode through-hole ABT serves as a conductive through-hole for electrically connecting the excitation electrode AB and the excitation electrode AB'. The vibration detection electrode SF and the ground electrode SB are electrodes constituting the above-described detection phase. The ground electrode through-hole SBT serves as a conductive through-hole for electrically connecting the ground electrode SB and the ground electrode SB'. In the piezoelectric element 30 illustrated in FIGS. 3A and 3B, the AC voltage can be supplied only from the second electrode surface 33a as in the piezoelectric element 30 illustrated in FIG. 2.

The positional relation among the side P, the length b, and the near-end zone σ in the piezoelectric element 30 illustrated in FIGS. 3A and 3B is similar to that described above in connection with one example, illustrated in FIG. 1, of the dust removing device according to the embodiment of the present invention, and to that described above in connection with one example, illustrated in FIG. 2, of the piezoelectric element used in the embodiment of the present invention. The length PL of a portion of the piezoelectric element 30, illustrated in FIGS. 3A and 3B, where the first electrode 32 and the second electrode 33 face each other is a length, taken in the direction along the side O, of a part of a region resulting from projecting the excitation electrode AF in a direction perpendicular to a surface thereof, the part being overlapped with the excitation electrode AB.

The electrode shapes are not limited to those illustrated in FIG. 2, and optimum electrode shapes may be selected in consideration of the size of the image pickup element 40, the material and the dimensions of the vibration plate 20, the positional relation between the piezoelectric element 30 and the image pickup element 40, and so on. While FIGS. 3A and 3B illustrate the example in which the electrodes are electrically connected to each other via the through-hole, the electrodes may be electrically connected to each other by forming the electrode in a shape extending from one side to the other side over a lateral surface of the piezoelectric element 30 as in the case of FIG. 2.

The piezoelectric material 31 used in the embodiment of the present invention will be described in detail below.

In the piezoelectric material 31 used in the embodiment of the present invention, a lead content is preferably less than 1000 ppm. In related-art piezoelectric elements, most of piezoelectric materials are piezoelectric ceramics containing lead zirconate titanate as a main component. It is, therefore, pointed out that, for example, when the piezoelectric elements are discarded and exposed to acid rain, or when they are left to stand in severe environments, lead components in the piezoelectric materials are dissolved into the soil, thus possibly causing harmful effects on the ecosystem. However, when the lead content is less than 1000 ppm, the possibility that lead components in the piezoelectric materials 31 may cause harmful effects on the environments is low, for example, even if the piezoelectric elements 30 are discarded and exposed to acid rain, or when they are left to stand in severe environments.

The lead content of the piezoelectric material 31 can be evaluated in terms of amount of lead, which is quantitatively measured by, e.g., an X-ray fluorescence (XRF) analysis or an ICP (Inductively Coupled Plasma) emission spectral analysis, with respect to total weight of the piezoelectric material 31.

The piezoelectric material 31 used in the embodiment of the present invention is desirably a piezoelectric ceramic containing barium titanate as a main component. Among piezoelectric ceramics containing no lead components, the piezoelectric ceramic containing barium titanate as a main component has a large absolute value d of the piezoelectric constant. Accordingly, a voltage required to obtain the same strain amount can be reduced. For that reason, the piezoelectric material 31 used in the embodiment of the present invention is desirably the piezoelectric ceramic containing barium titanate as a main component, taking into consideration the environmental effects as well.

The term "ceramic" used in this Description implies an aggregate (also called a bulk body) of crystal particles, which contain a metal oxide as a basic component, and which is sintered through heat treatment, i.e., the so-called polycrystal. The ceramic includes the polycrystal processed after sintering.

The piezoelectric material 31 used in the embodiment of the present invention desirably contains, as a main component, a perovskite metal oxide expressed by the following general formula (1):

$$(Ba_{1-x}Ca_x)(Ti_{1-y}Zr_ySn_z)O_3 \qquad (1)$$

(where $0.02 \leq x \leq 0.30$, $0.020 \leq y \leq 0.095$, $0 \leq z \leq 0.04$, and $y \leq x$)

The piezoelectric material 31 containing barium titanate as a main component has a temperature (Tr) at which there occurs phase transition from one ferroelectric crystal phase to another ferroelectric crystal phase.

Here, the term "ferroelectric crystal phase" implies a ferroelectric material that belongs to one of six crystal systems, i.e., triclinic, monoclinic, orthorhombic, hexagonal, trigonal or rhombohedral, and tetragonal systems, among seven crystal systems defining types of crystal lattices.

The phase transition temperature Tr can be determined, for example, by measuring the dielectric constant of the piezoelectric element 30 with application of a minute AC electric field while a measurement temperature is changed, and by obtaining a temperature at which the dielectric constant exhibits a maximum value. The phase transition temperature Tr can also be determined by measuring, with X-ray diffraction or Raman spectroscopy, a temperature at which a crystal phase of the piezoelectric element 30 or the piezoelectric material 31 is changed, while a measurement temperature is changed. In general, a ferroelectric has a slight temperature difference between a phase transition temperature from a first ferroelectric crystal phase to a second ferroelectric crystal phase (i.e., a phase transition temperature in temperature fall) and a phase transition temperature from the second ferroelectric crystal phase to the first ferroelectric crystal phase (i.e., a phase transition temperature in temperature rise). The phase transition temperature Tr used in the embodiment of the present invention is the phase transition temperature from the first ferroelectric crystal phase to the second ferroelectric crystal phase, i.e., the phase transition temperature in temperature fall.

Generally, the piezoelectric constant greatly increases toward a maximum value at the phase transition temperature Tr. Thus, near the phase transition temperature Tr, a change of the piezoelectric constant corresponding to a temperature change increases, and a strain amount with respect to the same input voltage changes. From the viewpoint of stabilizing the strain amount with respect to a temperature change, therefore, it is desired to use a piezoelectric material having the phase transition temperature Tr that falls outside the operating temperature range of the piezoelectric element. By employing such a piezoelectric material as the piezoelectric element 30 in the embodiment of the present invention, the piezoelectric element having stable vibration performance with respect to a temperature change can be obtained.

When selecting the piezoelectric material that is stable with respect to a temperature change, the phase transition temperature Tr is preferably −60° C. or higher and −10° C. or lower, or 40° C. or higher and the Curie temperature or lower, and more preferably −60° C. or higher and −30° C. or lower. In other words, the phase transition temperature Tr is preferably not in the range of 0° C. or higher and 35° C. or lower, and more preferably not in the range of −5° C. or higher and 50° C. or lower.

When the phase transition temperature Tr is not in the range of 0° C. or higher and 35° C. or lower, it is expected that a variation of the strain amount with respect to the same input voltage can be suppressed to 20% or less with respect to the temperature change of 5° C., for example. Furthermore, when the phase transition temperature Tr is not in the range of −5° C. or higher and 50° C. or lower, it is expected that a variation of the strain amount with respect to the same input voltage can be suppressed to 10% or less with respect to the temperature change of 5° C., for example.

In the present invention, the term "perovskite metal oxide" implies a metal oxide having a perovskite structure that is ideally a cubic structure, as described in "Iwanami Physicochemical Dictionary (Iwanami Shoten, Publishers, Feb. 20, 1998). The metal oxide having the perovskite structure is generally expressed by a chemical formula $ABO_3$. In the perovskite metal oxide, elements A and B occupy, in the form of ions, respective specific positions in a unit lattice, which are called an A site and a B site. In the case of a unit lattice of the cubic system, for example, the element A is positioned at an apex of a cube, and the element B is positioned at a body center. An element O is positioned, as a negative ion of oxygen, at a face center of the cube.

In the metal oxide expressed by the above-mentioned general formula (1), the metal elements positioned at the A site are Ba and Ca, and the metal elements positioned at the B site are Ti, Zr and Sn. Parts of Ba and Ca may be positioned at the B site. Similarly, parts of Ti and Zr may be positioned at the A site. It is, however, not preferable that Sn is positioned at the A site, because piezoelectric characteristics degrade.

While a molar ratio of the element at the B site to the element O is 1:3 in the general formula (1), the scope of the present invention involves even the case where the molar ratio is slightly deviated from 1:3 (e.g., in the range of 1.00:2.94 to 1.00:3.06) insofar as the metal oxide has the perovskite structure as a main phase.

Whether the metal oxide has the perovskite structure can be determined with a structural analysis based on X-ray diffraction or electron beam diffraction, for example.

In the general formula (1), x representing a molar ratio of Ca at the A site is in the range of $0.02 \leq x \leq 0.30$. If x is less than 0.02, a dielectric loss (tan δ) would increase. An increase of the dielectric loss increases an amount of heat generated when the piezoelectric element 30 is driven with application of a voltage, thus causing a possibility of reduction in driving efficiency. On the other hand, if x is more than 0.30, there would be a possibility that the piezoelectric characteristics are insufficient.

In the general formula (1), y representing a molar ratio of Zr at the B site is in the range of $0.020 \leq y \leq 0.095$. If y is less than 0.020, the piezoelectric characteristics would be insufficient. On the other hand, if y is more than 0.095, there would be a possibility that the Curie temperature Tc is reduced to be lower than 85° C. and the piezoelectric characteristics disappear at high temperature.

In the general formula (1), z representing a molar ratio of Sn at the B site is in the range of $0 \leq z \leq 0.04$. When Sn is contained at the B site in the above range of 0.04 mol or less, the dielectric loss is particularly reduced. On the other hand, if z is more than 0.04, there would be a possibility that the grain size is increased and heat is more apt to generate when the piezoelectric element is driven.

In the general formula (1), the molar ratio x of Ca and the molar ratio Y of Zr are in the ranges satisfying $y \leq x$. If $y > x$, the dielectric loss would be increased, or insulation performance would be insufficient. By setting x and y to satisfy the above-mentioned ranges at the same time, the phase transition temperature Tr can be moved from a room temperature or thereabout to a level lower than a practically useful temperature, and the piezoelectric element 30 can be stably driven over a wide temperature range.

In the general formula (1), A/B representing a ratio of molar quantity of Ba and Ca at the A site to molar quantity of Ti, Zr and Sn at the B site is preferably in the range of $1.00 \leq A/B \leq 1.01$. If A/B is less than 1.00, abnormal grain growth would be more apt to occur, and mechanical strength of the piezoelectric material 31 would be reduced. On the other hand, if A/B is more than 1.01, temperature necessary for grain growth would be too high. Thus, grain density would not be sufficiently large in the case using an ordinary firing furnace, and many pores or defects would be generated in the piezoelectric material 31.

A method for measuring the composition of the piezoelectric material 31 used in the embodiment of the present invention is not limited to particular one. Examples of the measuring method include an X-ray fluorescence analysis, an ICP emission spectral analysis, and an atomic absorption analysis. Weight ratios and composition ratios of the elements contained in the piezoelectric material 31 can be determined by employing any of those methods.

The piezoelectric material 31 used in the embodiment of the present invention contains, as a main component, the perovskite metal oxide expressed by the above-mentioned general formula (1), and the perovskite metal oxide contains Mn. The Mn content is preferably 0.02 weight part or more and 0.40 weight part or less in terms of metal with respect to 100 weight parts of the perovskite metal oxide. Furthermore, the content of the perovskite metal oxide contained in the piezoelectric material 31 is preferably 98% by weight or more and 100% by weight or less and more preferably 99% by weight or more and 99.98% by weight or less.

With the piezoelectric material 31 containing Mn in the above-mentioned range, insulation performance and a mechanical quality factor Qm are improved.

Here, the term "mechanical quality factor Qm" implies a factor representing an elastic loss caused by vibration when the piezoelectric element is evaluated as a vibrator. A magnitude of the mechanical quality factor Qm is observed in terms of sharpness of a resonance curve obtained with impedance measurement. In other words, the mechanical quality factor Qm is a constant representing sharpness of resonance of the piezoelectric element. As the mechanical quality factor Qm increases, the strain amount of the piezoelectric element near a resonance frequency increases, whereby the piezoelectric element 30 can be vibrated more effectively.

Here, the Mn content calculated in terms of metal represents a value that is determined by calculating weights of the elements, constituting the metal oxide expressed by the general formula (1), in terms of oxides from respective contents of individual metals, i.e., Ba, Ca, Ti, Zr, Sn and Mn, which are measured from the piezoelectric material 31 with the X-ray fluorescence analysis (XRF), the ICP emission spectral analysis, or the atomic absorption analysis, for example, and by obtaining a ratio of the Mn weight to a total of the calculated weights, the total weight being assumed to be 100.

If the Mn content is less than 0.02 weight part, the effect of polarization treatment required for driving of the piezoelectric element 30 would be insufficient. On the other hand, if the Mn content is more than 0.40 weight part, an unsatisfactory result would arise in that the piezoelectric characteristics are insufficient, or that crystals having the hexagonal structure not contributing to the piezoelectric characteristics are developed.

Desirably, Mn is dissolved in the B site in a solid state. When Mn is dissolved in the B site in a solid state, a preferable range of A/B is $0.993 \leq A/B \leq 0.998$ where A/B represents a ratio of molar quantity of Ba and Ca at the A site to molar quantity of Ti, Zr, Sn and Mn at the B site. In the piezoelectric element 30 with A/B being in the above range, large stretching vibration is generated in the lengthwise direction of the piezoelectric element 30, and the mechanical quality factor Qm is high. Therefore, the piezoelectric element 30 can be obtained with good vibration performance and good durability.

Moreover, the valence of Mn is desirably 4+. In general, Mn may have the valence of 4+, 2+, or 3+. When there is a conduction electron in a crystal (e.g., when an oxygen defect exists in a crystal, or when a donor element occupies the A site), the valence of Mn reduces from +4 to +3 or to +2, for example. Thus, the conduction electron can be trapped, and insulation resistance can be increased. Also from the viewpoint of ion radius, the valence of Mn being 4+ is preferable because Mn can be easily substituted for Ti that is a main component in the B site.

On the other hand, in the case of Mn having the valence of, e.g., 2+ lower than 4+, Mn serves as an acceptor. When Mn exists as an acceptor in a crystal having the perovskite structure, a hole or an oxygen vacancy is generated in the crystal.

If the valences of large part of added Mn are 2+ or 3+, holes could not be compensated for with introduction of oxygen vacancies, and the insulation resistance would be reduced. For that reason, most of Mn desirably has the valance of 4+. However, very small part of Mn may have the valance lower than 4+ and may form an oxygen vacancy by occupying, as an acceptor, the B site of the perovskite structure. The reason resides in that Mn having the valence of 2+ or 3+ and the oxygen vacancy form a defective dipole, to thereby increase the insulation performance and the mechanical quality factor Qm of the piezoelectric element 30.

The piezoelectric material 31 of the piezoelectric element 30 used in the embodiment of the present invention may contain other components (hereinafter referred to as "accessory components") other than the elements in the above-mentioned general formula (1) and Mn to such an extent that the specific characteristics are not changed. A total content of the accessory components is preferably 1.2 weight parts or less with respect to 100 weight parts of the metal oxide expressed by the general formula (1). If the total weight of the accessory components is more than 1.2 weight parts, there would be a possibility that the piezoelectric characteristics and the insulation characteristics of the piezoelectric material 31 degrade. A total content of metal elements among the accessory components, except for Ba, Ca, Ti, Zr, Sn and Mn, is preferably 1.0 weight part or less in terms of oxide, or 0.9 weight part or less in terms of metal with respect to the piezoelectric material 31. In the embodiment of the present invention, the metal elements include metalloid elements, such as Si, Ge and Sb. If the total content of the metal elements among the accessory components, except for Ba, Ca, Ti, Zr, Sn and Mn, exceeds 1.0 weight part in terms of oxide or 0.9 weight part in terms of metal with respect to the piezoelectric material 31, there would be a possibility that the piezoelectric characteristics and the insulation characteristics of the piezoelectric material 31 degrade significantly. A total content of elements Li, Na, Mg and Al among the accessory components is preferably 0.5 weight part or less in terms of metal with respect to the piezoelectric material 31. If the total content of the elements Li, Na, Mg and Al among the accessory components exceeds 0.5 weight part in terms of metal with respect to the piezoelectric material 31, there would be a possibility that sintering becomes insufficient. A total content of elements Y and V among the accessory components is preferably 0.2 weight part or less in terms of metal with respect to the piezoelectric material 31. If the total content of the elements Y and V among the accessory components exceeds 0.2 weight part in terms of metal with respect to the piezoelectric material 31, there would be a possibility that the polarization treatment is difficult to carry out.

The accessory components are, e.g., sintering aids such as Si and Cu. The piezoelectric material 31 used in the embodiment of the present invention may further contain Sr to such an extent that Sr is contained as an unavoidable component in commercially available materials of Ba and Ca. Similarly, the piezoelectric material 31 used in the embodiment of the present invention may further contain not only Nb to such an extent that Nb is contained as an unavoidable component in commercially available materials of Ti, but also Hf to such an extent that Hf is contained as an unavoidable component in commercially available materials of Zr.

A method for measuring the weight parts of the accessory components is not limited to particular one. Examples of the measuring method include the X-ray fluorescence analysis (XRF), the ICP emission spectral analysis, and the atomic absorption analysis.

A manufacturing method for the dust removing device 10 according to the embodiment of the present invention will be described in detail below.

First, a manufacturing method for the piezoelectric material 31 used in the embodiment of the present invention is described.

Material powder having a composition adjusted to desired one is prepared, and a compact is fabricated by adding and mixing a dispersant, a binder, a plasticizer, and water or an organic solvent, as required, to the material powder, and by pressing the mixture under pressure that is required to form a sintered body with high density. When the required pressure is not obtained with the pressing alone, pressure at a desired level may be applied using a Cold Isostatic Press (CIP), for example. A compact ingot may be fabricated in a single step by employing the CIP, for example, instead of the pressing. Alternatively, a green sheet compact may be fabricated by coating slurry over a support, e.g., a film, in a predetermined thickness by a doctor blade method or a die coating method, for example, and by drying the coated slurry.

Next, the compact is fired, whereby the piezoelectric material 31 is obtained in the form of a ceramic sintered body. While firing conditions may be selected to ones optimum for the desired piezoelectric material, the firing conditions are desirably set such that a density is as high as possible and grains grow into a uniform size. The compact may be fired after being machined to the desired shape, as required.

A manufacturing method for the piezoelectric element 30, illustrated in FIG. 2, which is one example of the piezoelectric element used in the embodiment of the present invention, will be described in detail below.

The piezoelectric material 31 having a substantially right-angled quadrate shape is obtained by grinding the piezoelectric material 31 in the form of the ceramic sintered body, which has been fabricated in accordance with the above-described method, into the desired dimensions. Then, the first electrode 32 is formed on the first electrode surface 32a, and the second electrode 33 is formed on the second electrode surface 33a as illustrated in FIG. 2 by, for example, baking, sputtering, or vapor-depositing a metal paste.

From the viewpoint of increasing efficiency in excitation of vibration, the first electrode 32 and the second electrode 33 are desirably formed on surfaces of the piezoelectric material 31 over regions as large as possible. A method for forming the first electrode 32 and the second electrode 33 is not limited to particular one, and the method may be carried out by, for example, baking, sputtering, or vapor depositing a metal paste. In addition, the first electrode 32 and the second electrode 33 may be each patterned into a desired shape.

The first electrode 32 may be formed in a portion of the second electrode surface 33a so that the AC voltage can be supplied to the piezoelectric element 30 through only the second electrode surface 33a. In such a case, initially, the first electrode 32 is formed on the first electrode surface 32a of the piezoelectric element 30, and the additional first electrode 32 is formed on the second electrode surface 33a in a state electrically independent of the second electrode 33. Then, the first electrode 32 formed on the first electrode surface 32a and the first electrode 32 formed on the second electrode surface 33a are electrically connected to each other. A method for electrically connecting both the first electrodes 32 is not limited to particular one, and the method may be carried out by, for example, baking, sputtering, or vapor-depositing a metal paste so as to cover a lateral surface of the piezoelectric material 31 for the electrical connection. Alternatively, the electrical connection may be established by forming a conductive through-hole in the piezoelectric material 31. In this respect, a distance between the first electrode 32 and the second electrode 33 both formed on the second electrode surface 33a is desirably as short as possible insofar as discharge will not occur during polarization treatment described below.

Next, the polarization treatment is carried out on the piezoelectric element 30. A treatment temperature is preferably not higher than the Curie temperature Tc or the depolarization temperature Td. A treatment time is preferably from 5 minutes to 10 hours. A treatment atmosphere is preferably air or nonflammable oil such as silicone oil. An electric field of 0.5 to 5.0 kV/mm is applied as a treatment voltage. The treatment voltage is just required to be applied to at least the first electrode 32 and the second electrode 33.

The term "depolarization temperature" implies a temperature that is determined by raising temperature from a room temperature to a certain temperature Td (° C.) after the elapse of a sufficient time from the polarization treatment carried out on the piezoelectric element 30, falling the temperature down to the room temperature again, and measuring a temperature at which the piezoelectric constant reduces from that before raising the temperature. In this Description, the temperature at which the piezoelectric constant reduces to 95% or less of that before raising the temperature is called the depolarization temperature Td.

The polarization treatment is desirably carried out before fixing the piezoelectric element 30 to the vibration plate 20, but it may be carried out after the fixing.

A manufacturing method for the piezoelectric element 30, illustrated in FIGS. 3A and 3B, which is one example of the piezoelectric element used in the embodiment of the present invention, will be described in detail below.

The manufacturing method for the piezoelectric element 30 illustrated in FIGS. 3A and 3B is similar to that for the piezoelectric element 30 illustrated in FIG. 2.

First, the piezoelectric material 31 having a substantially right-angled quadrate shape is obtained by grinding the piezoelectric material 31, which has been fabricated in a similar manner to the piezoelectric material 31 illustrated in FIG. 2, into the desired dimensions. The excitation electrode through-hole ABT and the ground electrode through-hole SBT are formed in the piezoelectric element 30 as illustrated in FIGS. 3A and 3B. Those through-holes may be formed, for example, by, after fabricating a compact, cutting or punching the compact. Alternatively, projections for forming the through-holes may be previously provided in a metallic mold used to fabricate the compact. The diameter of each through-hole may be selected as appropriate in consideration of the strength of the piezoelectric material 31 and easiness in forming the through-hole electrode.

Next, the excitation electrode AB and the ground electrode SB on the first electrode surface 32a, and the excitation electrode AF, the vibration detection electrode SF, the excitation electrode AB', and the ground electrode SB' on the second electrode surface 33a are formed in a similar manner to the electrodes in the piezoelectric element 30 illustrated in FIG. 2. The through-hole electrodes illustrated in FIGS. 3A and 3B may be formed at the same time when the above-mentioned electrodes are formed, or they may be previously formed in a separate step. The through-hole electrodes are desirably formed such that respective resistance values between the excitation electrode AB and the excitation electrode AB' and between the ground electrode SB and the ground electrode SB' are each 1Ω or less.

Next, the polarization treatment is carried out on the piezoelectric element 30. A method for the polarization treatment may be similar to that carried out on the piezoelectric element 30 illustrated in FIG. 2. The treatment voltage is just required to be applied to at least the excitation electrode AB, the ground electrode SB, the excitation electrode AF on the second electrode surface 33a, and the vibration detection electrode SF.

A manufacturing method for the dust removing device 10, illustrated in FIGS. 4A and 4B, which is one example of the dust removing device according to the embodiment of the present invention, will be described in detail below.

In the manufacturing method for the dust removing device according to the embodiment of the present invention, the dust removing device includes at least a vibration plate including, in a surface thereof, at least an optical effective region B having a substantially right-angled quadrate shape and an outer region A positioned outside the optical effective region B, and one or more piezoelectric elements each having a substantially rectangular parallelepiped shape and disposed on the surface of the vibration plate, the piezoelectric element including a piezoelectric material, a first electrode, and a second electrode. The manufacturing method includes steps of fixing each piezoelectric element to the outer region A positioned outside the optical effective region B of the vibration plate 20 such that, when four sides of the optical effective region B are denoted by a pair of sides O and O' and a pair of sides N and N' perpendicular to the pair of sides O and O', a side P of the piezoelectric element in a lengthwise direction thereof is disposed along the side O; specifying, as an near-end zone σ of the piezoelectric element, a region positioned in one end portion of the piezoelectric element in a direction along the side O and spanning along the side P over a length b inwards from a line, which is an extension of the side N or N' of the optical effective region B and which intersects the piezoelectric element 30; and heat press-bonding an electric supply line, through which an AC voltage is supplied to the piezoelectric element, to the near-end zone σ while a relation of $d>d_0$ is satisfied where d denotes an absolute value of piezoelectric constant of the piezoelectric material in a region other than the near-end zone σ, and $d_0$ denotes an absolute value of the piezoelectric constant in the near-end zone σ.

Figure 4A:
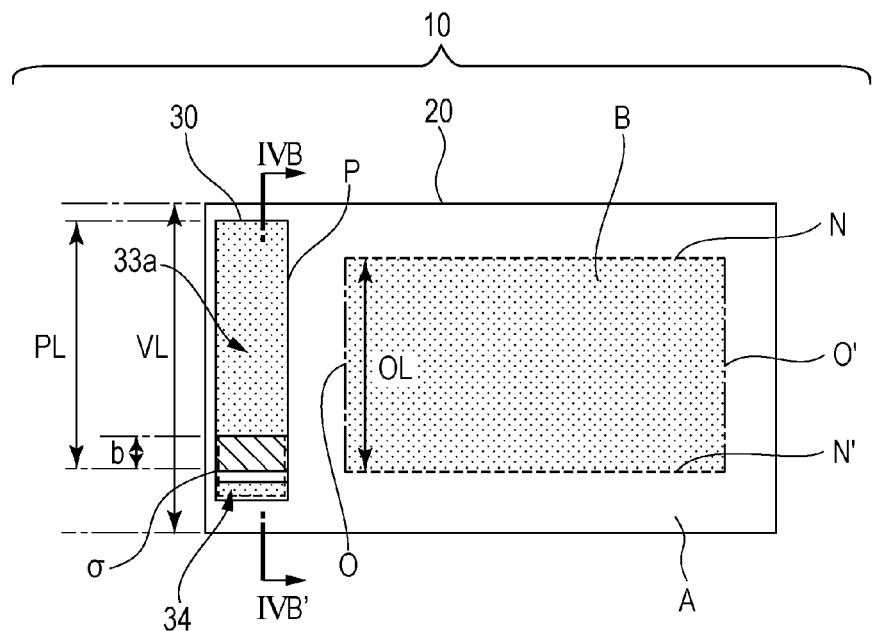
FIGS. 4A and 4B illustrate one example of a manufacturing method for the dust removing device according to the embodiment of the present invention when observed from the direction of the optical axis.
Figure 4B:
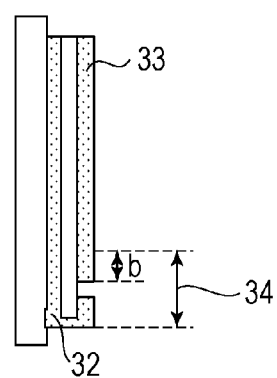

FIGS. 4A and 4B illustrate one example of the manufacturing method for the dust removing device according to the embodiment of the present invention when observed from the direction of the optical axis. A piezoelectric element 30 illustrated in FIGS. 4A and 4B is described on an assumption that it is the same as the piezoelectric element 30 illustrated in FIG. 2.

First, the first electrode 32 of the piezoelectric element 30 is fixed to the vibration plate 20, which is formed of a transparent member or a reflecting member, by employing, e.g., an adhesive such as an epoxy-based adhesive. When heating is required to fix the first electrode 32, the heating temperature is desirably lower than the Curie temperature Tc or the depolarization temperature Td of the piezoelectric material 31. If the heating temperature for the fixing is not lower than the Curie temperature Tc or the depolarization temperature Td, there would be a possibility that the absolute value d of piezoelectric constant of the piezoelectric material 31 is reduced.

Next, as illustrated in FIGS. 4A and 4B, electric supply lines through each of which the AC voltage is supplied to the piezoelectric element 30 is connected as follows. The electric supply line for the second electrode 33 is connected, by heat press bonding, to the near-end zone σ in the second electrode surface 33a of the piezoelectric element 30 illustrated in FIG. 2. The electric supply line for the first electrode 32 is connected, by heat press bonding, to the first electrode 32 on the second electrode surface 33a of the piezoelectric element 30 illustrated in FIG. 2. Steps of the heat press bonding for the two electrodes may be performed at the same time as illustrated in FIGS. 4A and 4B. The simultaneous bonding enables the piezoelectric element 30 and both the electric supply lines to be connected to each other by one step of the heat press bonding. In FIGS. 4A and 4B, reference sign 34 denotes a heat press bonding region for a flexible printed cable. As illustrated in a sectional view of FIG. 4B, the heat press bonding region 34 for the flexible printed cable is a region including a part of the second electrode 33 on the second electrode surface 33a, and a part of the first electrode 32 spanning from the first electrode surface 32a to the second electrode surface 33a, the latter part being positioned near the end of the second electrode surface 33a. FIGS. 4A and 4B illustrate an example in which the heat press bonding region for the second electrode 33 on the second electrode surface 33a is provided as a region overlapping with the near-end zone σ. However, the heat press bonding region is not limited to the region overlapping with the near-end zone σ. Similar advantageous effects are also obtained even when the near-end zone σ and the heat press bonding region are not overlapped with each other, depending on the shape of the flexible printed cable and conditions of the heat press bonding.

The heat press bonding is performed at temperature preferably near the depolarization temperature Td of the piezoelectric material 31 and more preferably not lower than Td. The piezoelectric constant $d_0$ in the near-end zone σ of the piezoelectric material 31 can be reduced by carrying out the heat press bonding at the temperature near Td or not lower than Td. The piezoelectric constant $d_0$ in the near-end zone σ can be further reduced or made zero (0) by carrying out the heat press bonding at a temperature not lower than the Curie temperature Tc.

By carrying out the heat press bonding in the above-described manner, The piezoelectric constant of the piezoelectric material 31 used in the embodiment of the present invention satisfies the relation of $d>d_0$ where d denotes the absolute value of piezoelectric constant of the piezoelectric material in the region other than the near-end zone σ, and $d_0$ denotes the absolute value of the piezoelectric constant in the near-end zone σ.

When $d_0$ is reduced to an excessively small value or zero (0), $d_0$ can be adjusted to a desired value with re-polarization treatment. A temperature for the re-polarization treatment is desirably set to a range where the piezoelectric element 30 fixed to the vibration plate 20 with an adhesive and connected portions of the electric supply lines having been heat press-bonded are not detached. The temperature for the re-polarization treatment is, for example, preferably 60° C. or lower and more preferably a room temperature (about 25° C.). A voltage for the re-polarization treatment is desirably set to a range where discharge does not occur between wiring lines, e.g., between the electric supply lines.

While a method of reducing the piezoelectric constant $d_0$ in the near-end zone σ of the piezoelectric material 31 has been described above, the method of reducing $d_0$ is not limited to the above-described one. That method can also be realized, for example, by applying heat at temperature not lower than Td to the near-end zone σ after connecting the electric supply lines at temperature lower than Td. However, such a method increases the manufacturing cost because the manufacturing process is complicated. It is hence desired that the heat press bonding is carried out at temperature preferably near Td and more preferably not lower than Td.

A flexible cable commercially available in general can be used as each of the electric supply lines. While the electric supply line may be connected using, e.g., an epoxy-based adhesive, the electric supply line is desirably connected by the heat press bonding using an anisotropic conductive paste (ACP) or an anisotropic conductive film (ACF). The latter method is desirable in that a conduction failure can be reduced, and that the process speed can be increased and higher mass productivity can be obtained. The bonding of the electric supply lines is desirably made on the region illustrated in FIGS. 4A and 4B.

The manufacturing method for the dust removing device 10, according to the embodiment of the present invention, is featured in that, as described above, the electric supply line through which the AC voltage is supplied to the piezoelectric element 30 is heat press-bonded to the near-end zone σ. In general, the heat press bonding temperature when the heat press bonding is carried out using the ACP or the ACF is from 150° C. to 200° C. Therefore, when the Curie temperature Tc of the piezoelectric material 31 is 200° C. or higher, the heat press bonding temperature has to be set higher than the heat press bonding temperature that is generally employed in the heat press bonding using the ACP or the ACF. Furthermore, because the heat press bonding is a method of locally heating the piezoelectric element 30, there is a possibility that the piezoelectric material 31 may break depending on a temperature difference between a heated portion and a not-heated portion. Accordingly, the Curie temperature Tc of the piezoelectric material 31 used in the embodiment of the present invention is preferably 150° C. or lower. While the manufacturing method for the dust removing device 10, illustrated in FIGS. 4A and 4B, has been described above, the dust removing device 10 may be manufactured by a method other than described above. In any case, the dust removing device 10 according to the embodiment of the present invention can be easily manufactured by heat press-bonding the electric supply line, through which an AC voltage is supplied to the piezoelectric element 30, to the near-end zone σ.

An image pickup apparatus 50 illustrated in FIG. 5, which is one example of the image pickup apparatus according to an embodiment of the present invention, will be described in detail below.

Figure 5:
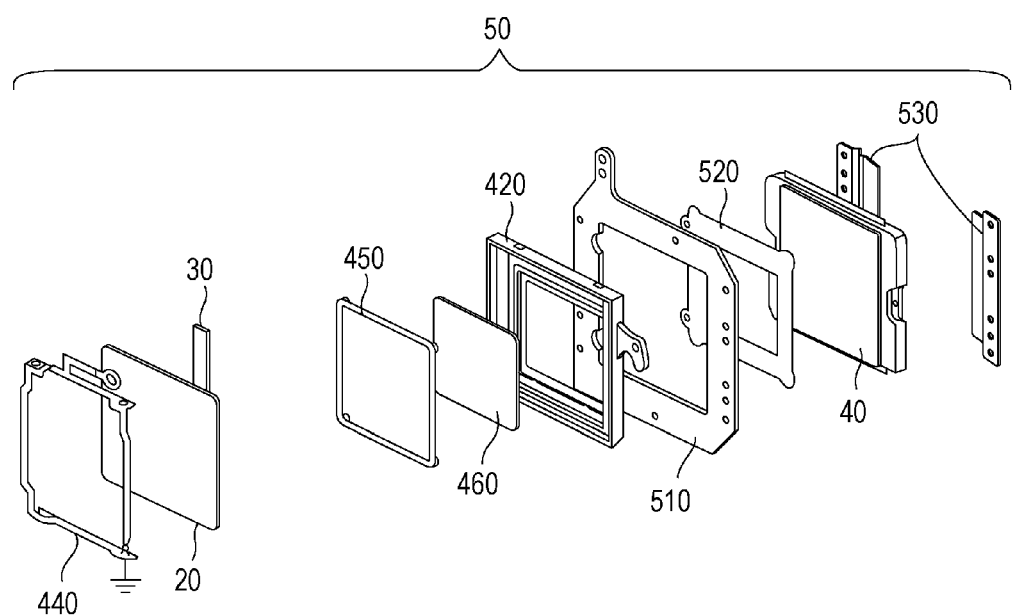
FIG. 5 illustrates one example of an image pickup apparatus according to an embodiment of the present invention.

FIG. 5 illustrates one example of the image pickup apparatus according to the embodiment of the present invention. The image pickup apparatus 50 illustrated in FIG. 5 is one example of an image pickup apparatus particularly used in a digital camera that takes an image through conversion of an image signal to an electric signal.

The image pickup apparatus 50 according to the embodiment of the present invention is featured in including at least the dust removing device 10 and the image pickup element 40, and in arranging the vibration plate 20 of the dust removing device 10 and a light receiving surface of the image pickup element 40 successively in coaxial relation.

The vibration plate 20 positioned in front of the image pickup element 40 is an optical member having a substantially right-angled quadrate shape, arranged on an optical axis, and including the optical effective region B through which light incident upon the image pickup element 40 is able to pass. The vibration plate 20 can be given with plural functions, including the dust removing function, by employing a quartz plate or a LiNbO3 birefringent plate, which has the function of a low-pass filter, or an infrared absorption glass, for example. An optical coating to cut infrared rays or to reduce reflection may be applied to the surface of the vibration plate 20.

The piezoelectric element 30 is fixed to the outer region A of the vibration plate 20. Though not illustrated, the piezoelectric element may be fixed to each of symmetrical positions in the outer region A on both sides of the optical effective region B (e.g., in the horizontal or vertical direction).

A vibration plate holding member 420 is made of resin or metal, and it holds the vibration plate 20. The vibration plate holding member 420 is fixedly screwed to an image pickup element holding member 510.

A biasing member 440 biases the vibration plate 20 in a direction toward the image pickup element 40. The biasing member 440 is secured to the vibration plate holding member 420. The biasing member 440 is electrically connected to a portion (ground) of the digital camera, which is kept at the ground potential. The surface of the vibration plate 20 is also electrically connected to the portion (ground) of the digital camera, which is kept at the ground potential. Thus, dust etc. can be suppressed from adhering to the surface of the vibration plate 20 by static electricity.

An elastic member 450 has a frame-like member having a substantially circular cross-section, and it is sandwiched between the vibration plate 20 and the vibration plate holding member 420. Because the biasing member 440 biases the vibration plate 20, the elastic member 450 is pressed between the vibration plate 20 and the vibration plate holding member 420. Accordingly, a magnitude of force acting to press the elastic member 450 is determined depending on the biasing force of the biasing member 440 in the direction toward the image pickup element 40. The elastic member 450 may be made of a thermoplastic elastomer, such as rubber, or a resin foam, such as a urethane foam.

An optical member 460 is a phase plate (depolarization plate), an infrared cut filter, a birefringent plate, or an optical member formed by bonding two or more of the formers. The optical member 460 is fixedly bonded to the vibration plate holding member 420.

The image pickup element holding member 510 has an opening in a substantially rectangular shape and fixedly holds the image pickup element 40 in such a state that the image pickup element 40 is exposed through the opening. The image pickup element holding member 510 is fixed to a body of the digital camera by screwing, for example.

A mask 520 is sandwiched between the vibration plate holding member 420 and the image pickup element 40 to prevent extra light from entering the image pickup element 40 from the surroundings other than an optical path for photographing.

Image pickup element biasing members 530 are a pair of right and left biasing members in the form of leaf springs. The image pickup element biasing members 530 are fixedly screwed to the image pickup element holding member 510, thereby pressing the image pickup element 40 against the image pickup element holding member 510.

With the arrangement described above, the vibration plate 20 is supported in a state capable of freely vibrating while it is sandwiched between the biasing member 440 and the elastic member 450.

A surface of the elastic member 450 on the side closer to a photographer contacts the vibration plate holding member 420, and a surface thereof on the side closer to an object contacts the vibration plate 20. Because the vibration plate 20 is biased toward the image pickup element 40 by resiliency of the urging member 440, the elastic member 450 is deformed such that the elastic member 450 is closely contacted with both the vibration plate 20 and the vibration plate holding member 420 without leaving clearances. As a result, a space surrounded by the vibration plate 20, the vibration plate holding member 420, the elastic member 450, and the optical member 460 is sealed off, thus forming an enclosed space that can prevent foreign matter, such as dust, from entering the space.

While the image pickup apparatus 50 used in the digital camera has been described above as one example of the image pickup apparatus according to the embodiment of the present invention, embodiments of the present invention are not limited to the image pickup apparatus used in the digital camera. The present invention is further applicable to not only various types of image pickup apparatuses and image reading apparatuses, such as a digital video camera, a copying machine, a facsimile, and a scanner, but also to various members and components disposed in those apparatuses.

An operation method for the dust removing device 10 used in a digital camera will be described below as one example of an operation method for the dust removing device 10 according to the embodiment of the present invention.

The dust removing device 10 comes into a dust removing mode in accordance with an instruction from a microcomputer in the digital camera. From the viewpoint of reliably removing dust, it is effective to automatically execute the dust removing mode at timing immediately after a system is started up with a power-on operation for the digital camera by the photographer, or immediately before the system is shut down with a power-off operation. However, the dust removing mode may be executed at timing intended by the photographer.

The microcomputer receives a signal indicating the start of the dust removing mode, and sends a driving signal to a drive circuit for the piezoelectric element 30. The drive circuit for the piezoelectric element 30 produces an AC voltage for causing the vibration plate 20 to generate flexural vibration, and applies the AC voltage to the piezoelectric element 30 through the electric supply lines. The AC voltage applied to the piezoelectric element 30 in the dust removing mode is set such that frequency of the AC voltage is successively changed within a frequency range including a frequency at which the flexural vibration is generated. The piezoelectric element 30 exhibits stretching vibration in the lengthwise direction corresponding to the applied AC voltage, whereby the vibration plate 20 generates the flexural vibration.

EXAMPLES

The dust removing device 10 according to the embodiment of the present invention will be described in more detail below in connection with Examples. While dust removing devices fabricated in Examples and Comparative Examples have the same structure as illustrated in FIGS. 4A and 4B, the scope of the present invention is not restricted by the following Examples.

Example 1

The vibration plate 20 in the dust removing device 10 of Example 1 is a rectangular parallelepiped birefringent plate made of quartz with dimensions of 26.8×38.4×0.7 mm and having surfaces subjected to optical coating treatment. The vibration plate 20 is arranged on an optical path. The vibration plate 20 includes, as illustrated in FIG. 1, the optical effective region B through which light passes. The optical effective region B in the dust removing device 10 of Example 1 has a substantially right-angled quadrate shape with dimensions of about 14.9×22.3 mm.

A method of fabricating the piezoelectric element 30 of Example 1 is as follows. As raw materials, barium titanate (BT-01 made by SAKAI CHEMICAL INDUSTRY CO., LTD.) having an average particle diameter of 100 nm, calcium titanate (CT-03 made by SAKAI CHEMICAL INDUSTRY CO., LTD.) having an average particle diameter of 300 nm, calcium zirconate (CZ-03 made by SAKAI CHEMICAL INDUSTRY CO., LTD.) having an average particle diameter of 300 nm, and calcium stannate having an average particle diameter of 300 nm were weighed at a molar ratio of 86.0:8.6:4.4:1.0. The calcium stannate was prepared from calcium carbonate and tin oxide by the solid phase method.

Next, those powders weighed as mentioned above were mixed together for 24 hours by dry mixing with a ball mill. To granulate the powder mixture, manganese (II) acetate containing 0.26 weight part of Mn in terms of metal with respect to the powder mixture and 3 weight parts of a PVA binder with respect to the powder mixture were attached to the surface of the powder mixture by employing a spray dryer device.

Next, the granulated powder was filled into a metallic mold, and a compact having a density of 3.3 g/cm$^3$ was fabricated by applying a compacting pressure of 200 MPa at maximum with a press-forming machine. The compact may be further pressed using a cold isostatic press.

The obtained compact was fired in an air atmosphere under conditions of heating the compact at a temperature rising rate of 2.5° C./min, holding it at 600° C. for 3 hours, and further holding it at 1350° C. for 5 hours. The piezoelectric material 31 having the composition expressed by the above-mentioned chemical formula (1) was thus fabricated. The piezoelectric material 31 was then subjected to an X-ray fluorescent analysis. As a result, it was confirmed that the piezoelectric material 31 had the composition containing 0.2 weight part of Mn with respect to 100 weight parts of $(Ba_{0.86}Ca_{0.14})(Ti_{0.946}Zr_{0.044}Sn_{0.01})O_3$. Furthermore, the contents of elements other than Ba, Ca, Ti, Zr, Sn and Mn were not more than the detection limit, and were not more than 1 weight part.

Next, the fired piezoelectric material 31 was ground and polished to a substantially uniform thickness of 0.25 mm, and was cut into pieces each having dimensions of 25.6×4.0 mm. Then, after coating a silver paste over both surfaces of the piezoelectric material 31 by screen printing, the first electrode 32 and the second electrode 33 were formed through patterning as illustrated in FIG. 2. In the dust removing device 10 of Example 1, the first electrode 32 was formed in a shape extending up to the second electrode surface 33a. However, the advantageous effects of the present invention can be similarly obtained with other electrode arrangements than that of Example 1.

Next, the Curie temperature Tc providing a locally-maximized dielectric constant was measured by measuring changes of the dielectric constant while temperature of the fabricated piezoelectric element 30 was gradually raised in a thermostatic oven. As a result, the Curie temperature Tc was 105° C. Furthermore, the polarization treatment was carried out by applying a voltage to the second electrode 33 from a DC power supply for 60 minutes so as to generate an electric field with strength of 1 kV/mm while the piezoelectric element 30 was heated to 100° C. with a hot plate. Thereafter, the depolarization temperature Td at which the piezoelectric constant was reduced down to 95% or less of an initial value was measured while the temperature of the piezoelectric element 30 was raised or lowered in the thermostatic oven. As a result, Td was 95° C.

Next, the piezoelectric element 30 in a polarized state was fabricated by applying the voltage to the second electrode 33 from the DC power supply for 60 minutes so as to generate the electric field with strength of 1 kV/mm while the piezoelectric element 30 was heated to 100° C. with the hot plate.

Next, flexible cables were connected, by heat press bonding using an ACF, to the second electrode surface 33a of the fabricated piezoelectric element 30, specifically to the near-end zone σ that was a part of the second electrode 33, and to a part of the first electrode 32, as illustrated in FIGS. 4A and 4B. Conditions of a heat press bonding apparatus to carry out the heat press bonding with the use of the ACF were set to 150° C., 10 sec, and a pressure of 2 MPa.

Next, the vibration plate 20 and the first electrode surface 32a of the piezoelectric element 30 were bonded to each other with an epoxy resin-based adhesive after alignment for setting the above-mentioned length b to 1.5 mm.

The image pickup apparatus 50 according to the embodiment of the present invention, illustrated in FIG. 5, was fabricated by employing the dust removing device 10 fabricated as described above.

A dust removal rate of the dust removing device 10 was measured in a state where the dust removing device 10 was assembled into the image pickup apparatus 50 illustrated in FIG. 5.

In the measurement using the dust removing device 10, after scattering polystyrene beads (with particle diameters of 20 to 80 μm) over the entire surface of the vibration plate 20, placed to lie horizontally, in environment at a room temperature and humidity of 50% rh and then leaving the beads for 1 minute as they are, the dust removing device 10 was set such that the surface of the vibration plate 20, including the optical effective region B, was oriented vertically. In that setting condition, a state of the polystyrene beads adhering to the surface of the vibration plate 20 was imaged by an optical microscope and was recorded as a photo P.

An AC voltage of 50 Vpp was applied to the piezoelectric element 30 of the dust removing device 10 through the flexible cables. A frequency of the AC voltage was set to the range of 160 to 90 kHz, and the frequency was swept over the range in one second from the higher side to the lower side. After repeating the above driving operation four times, the posture of the image pickup apparatus 50 was repeatedly moved twenty times over the range from an elevation angle of 90° to a depression angle of 90°. Then, as in the case of recording the photo P, a state of the polystyrene beads adhering to the surface of the vibration plate 20 was imaged by the optical microscope and was recorded as a photo Q.

Next, the dust removal rate of the dust removing device 10 was determined by counting the numbers of the polystyrene beads, which were imaged in the photos P and Q, as a bead number P' and a bead number Q', respectively, and by calculating a value of [(bead number P'−bead number Q')÷bead number P']×100. Here, the dust removal rate of 95% or less is judged as a level significantly degrading image quality because, when exceeding such a level, dust is taken into a photographed image in general use situation of the image pickup apparatus 50.

As a result of evaluating the dust removal rate of the dust removing device 10 of Example 1 in accordance with the above-described method, the dust removal rate of the dust removing device 10 of Example 1 was 98%. It was hence confirmed that the dust removing device 10 of Example 1 can provide not only a dust removing device having a good dust removal rate, but also the image pickup apparatus 50 having good image quality.

Next, the absolute values d and $d_0$ of piezoelectric constant of the piezoelectric material 31 were measured. The measurement of d and $d_0$ was performed by, after separating the piezoelectric element 30 from the vibration plate 20, cutting the piezoelectric element 30 into the desired shape. More specifically, after measuring the dust removal rate of the dust removing device 10, the image pickup apparatus 50 of Example 1 was disassembled, and the dust removing device 10 was taken out. The dust removing device 10 was immersed in an organic solvent and was left to stand while the dust removing device 10 was swung in the organic solvent under application of ultrasonic waves (i.e., ultrasonic treatment). With the ultrasonic treatment, the adhesive on the surface of the piezoelectric element 30 was dissolved, and the piezoelectric element 30 was separated from the vibration plate 20, the flexible cables, and the ACF. Thereafter, a portion of the piezoelectric element 30 corresponding to the above-mentioned length PL was cut into the near-end zone σ and the other region at an aspect ratio in conformity with the standard stipulated by Japan Electronics and Information Technology Association. Here, d and $d_0$ were each determined as an absolute value of the piezoelectric characteristic $d_{31}$ measured by the resonance-anti-resonance method. As a result of evaluating d and $d_0$ of the dust removing device 10 of Example 1 in accordance with the above-described method, $d_0$ was $71\times10^{-12}$ m/V, and d was $75\times10^{-12}$ m/V.

Example 2

The dust removing device 10 of Example 2 was fabricated in accordance with a similar method to that in Example 1 except for the following points. The piezoelectric element 30 was bonded to the vibration plate 20 with the position of the flexible cable adjusted to provide the length b of 0.1 mm. The conditions of the heat press bonding apparatus to carry out the heat press bonding with the use of the ACF were set to 150° C., 60 sec, and a pressure of 2 MPa.

The image pickup apparatus 50 according to the embodiment of the present invention was fabricated in accordance with a similar method to that in Example 1, and the dust removal rate of the dust removing device 10 of Example 2 was evaluated. As a result, the dust removal rate of the dust removing device 10 of Example 2 was 100%. Furthermore, as a result of evaluating d and $d_0$ of the dust removing device 10 of Example 2 in a similar manner to that in Example 1, $d_0$ was $68\times10^{-12}$ m/V, and d was $75\times10^{-12}$ m/V.

Example 3

The dust removing device 10 of Example 3 was fabricated in accordance with a similar method to that in Example 1. The piezoelectric element 30 was bonded to the vibration plate 20 with the position of the flexible cable adjusted to provide the length b of 1.5 mm. The conditions of the heat press bonding apparatus to carry out the heat press bonding with the use of the ACF were set to 150° C., 60 sec, and a pressure of 2 MPa.

The image pickup apparatus 50 according to the embodiment of the present invention was fabricated in accordance with a similar method to that in Example 1, and the dust removal rate of the dust removing device 10 of Example 3 was evaluated. As a result, the dust removal rate of the dust removing device 10 of Example 3 was 99%. Furthermore, as a result of evaluating d and $d_0$ of the dust removing device 10 of Example 3 in a similar manner to that in Example 1, $d_0$ was $68\times10^{-12}$ m/V, and d was $75\times10^{-12}$ m/V.

Example 4

The dust removing device 10 of Example 4 was fabricated in accordance with a similar method to that in Example 1 except for the following points. The piezoelectric element 30 was bonded to the vibration plate 20 with the position of the flexible cable adjusted to provide the length b of 14.7 mm. The conditions of the heat press bonding apparatus to carry out the heat press bonding with the use of the ACF were set to 150° C., 60 sec, and a pressure of 2 MPa.

The image pickup apparatus 50 according to the embodiment of the present invention was fabricated in accordance with a similar method to that in Example 1, and the dust removal rate of the dust removing device 10 of Example 4 was evaluated. As a result, the dust removal rate of the dust removing device 10 of Example 4 was 95%. Furthermore, as a result of evaluating d and $d_0$ of the dust removing device 10 of Example 4 in a similar manner to that in Example 1, $d_0$ was $68 \times 10^{-12}$ m/V, and d was $75 \times 10^{-12}$ m/V.

Example 5

The dust removing device 10 of Example 5 was fabricated in accordance with a similar method to that in Example 1 except for the following points. The piezoelectric element 30 was bonded to the vibration plate 20 with the position of the flexible cable adjusted to provide the length b of 14.7 mm. The conditions of the heat press bonding apparatus to carry out the heat press bonding with the use of the ACF were set to 150° C., 200 sec, and a pressure of 2 MPa.

The image pickup apparatus 50 according to the embodiment of the present invention was fabricated in accordance with a similar method to that in Example 1, and the dust removal rate of the dust removing device 10 of Example 5 was evaluated. As a result, the dust removal rate of the dust removing device 10 of Example 4 was 96%. Furthermore, as a result of evaluating d and $d_0$ of the dust removing device 10 of Example 5 in a similar manner to that in Example 1, $d_0$ was $23 \times 10^{-12}$ m/V, and d was $75 \times 10^{-12}$ m/V.

Example 6

The dust removing device 10 of Example 6 was fabricated in accordance with a similar method to that in Example 1 except for the following points. The piezoelectric element 30 was bonded to the vibration plate 20 with the position of the flexible cable adjusted to provide the length b of 0.1 mm. The conditions of the heat press bonding apparatus to carry out the heat press bonding with the use of the ACF were set to 150° C., 90 sec, and a pressure of 2 MPa.

The image pickup apparatus 50 according to the embodiment of the present invention was fabricated in accordance with a similar method to that in Example 1, and the dust removal rate of the dust removing device 10 of Example 6 was evaluated. As a result, the dust removal rate of the dust removing device 10 of Example 6 was 99%. Furthermore, as a result of evaluating d and $d_0$ of the dust removing device 10 of Example 6 in a similar manner to that in Example 1, $d_0$ was $60 \times 10^{-12}$ m/V, and d was $75 \times 10^{-12}$ m/V.

Example 7

The dust removing device 10 of Example 7 was fabricated in accordance with a similar method to that in Example 1 except for the following points. The piezoelectric element 30 was bonded to the vibration plate 20 with the position of the flexible cable adjusted to provide the length b of 0.7 mm. The conditions of the heat press bonding apparatus to carry out the heat press bonding with the use of the ACF were set to 150° C., 6000 sec, and a pressure of 2 MPa.

The image pickup apparatus 50 according to the embodiment of the present invention was fabricated in accordance with a similar method to that in Example 1, and the dust removal rate of the dust removing device 10 of Example 7 was evaluated. As a result, the dust removal rate of the dust removing device 10 of Example 7 was 95%. Furthermore, as a result of evaluating d and $d_0$ of the dust removing device 10 of Example 7 in a similar manner to that in Example 1, $d_0$ was $0 \times 10^{-12}$ m/V, and d was $75 \times 10^{-12}$ m/V.

Comparative Example 1

A dust removing device of Comparative Example 1 was fabricated in accordance with a similar method to that in Example 1. However, commercially available lead zirconate titanate (made by Nihon Ceratec CO., LTD.) was used as the piezoelectric material. The piezoelectric element was bonded to the vibration plate with the position of the flexible cable adjusted to provide the length b of 1.5 mm. The conditions of the heat press bonding apparatus to carry out the heat press bonding with the use of the ACF were set to 150° C., 6000 sec, and a pressure of 2 MPa.

An image pickup apparatus of Comparative Example 1 was fabricated in accordance with a similar method to that in Example 1, and the dust removal rate of the dust removing device of Comparative Example 1 was evaluated. As a result, the dust removal rate of the dust removing device of Comparative Example 1 was 93%. Furthermore, as a result of evaluating d and $d_0$ of the dust removing device of Comparative Example 1 in a similar manner to that in Example 1, $d_0$ was $160 \times 10^{-12}$ m/V, and d was $160 \times 10^{-12}$ m/V.

Table 1 lists the above-described results of Examples 1 to 7 and Comparative Example 1.

TABLE 1

|  | Example 1 | Example 2 | Example 3 | Example 4 | Example 5 | Example 6 | Example 7 | Com. Ex. 1 |
|---|---|---|---|---|---|---|---|---|
| VL (mm) | 26.8 | 26.8 | 26.8 | 26.8 | 26.8 | 26.8 | 26.8 | 26.8 |
| PL (mm) | 20 | 20 | 20 | 20 | 20 | 20 | 20 | 20 |
| OL (mm) | 14.9 | 14.9 | 14.9 | 14.9 | 14.9 | 14.9 | 14.9 | 14.9 |
| b (mm) | 1.5 | 0.1 | 1.5 | 14.7 | 14.7 | 0.1 | 0.7 | 1.5 |
| 100 × b/OL (%) | 10 | 1 | 10 | 99 | 99 | 1 | 5 | 10 |
| d ($10^{-12}$ × m/V) | 75 | 75 | 75 | 75 | 75 | 75 | 75 | 160 |
| $d_0$ ($10^{-12}$ × m/V) | 71 | 68 | 68 | 68 | 23 | 60 | 0 | 160 |
| ($d_0$/d) × 100 (%) | 95 | 90 | 90 | 90 | 30 | 80 | 0 | 100 |
| Dust Removal Rate (%) | 98 | 100 | 99 | 95 | 96 | 99 | 95 | 93 |

According to the embodiments of the present invention, the dust removing device and the manufacturing method for the dust removing device can be provided, which can satisfactorily remove dust adhering to the optical effective region of the vibration plate. In addition, according to the embodiment of the present invention, the image pickup apparatus can be provided which employs the dust removing device and which can take an image with good quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-092768, filed Apr. 25, 2013, which is hereby incorporated by reference herein in its entirety.

INDUSTRIAL APPLICABILITY

Because the dust removing device according to the embodiment of the present invention is able to remove foreign matter, such as dust, adhering to the surface of a vibration plate, the dust removing device can be applied to various types of image pickup apparatuses and image reading apparatuses, such as a digital video camera, a copying machine, a facsimile, and a scanner.

REFERENCE SIGNS LIST 10 dust removing device
20 vibration plate
30 piezoelectric element
31 piezoelectric material
32 first electrode
32a first electrode surface
33 second electrode
33a second electrode surface
34 heat press bonding region for flexible printed cables
40 image pickup element
50 image pickup apparatus
440 biasing member
450 elastic member
460 optical member
420 vibration plate holding member
510 image pickup element holding member
520 mask
530 image pickup element biasing member

The invention claimed is:

1. A dust removing device including a vibration plate and piezoelectric elements disposed on the vibration plate, wherein the vibration plate includes an optical effective region B having a substantially right-angled quadrate shape and an outer region A positioned outside the optical effective region B, wherein the piezoelectric element includes a substantially rectangular parallelepiped piezoelectric material, and a first electrode and a second electrode disposed on the piezoelectric material to face each other, wherein given that four sides of the optical effective region B are denoted by a pair of sides O and O' and a pair of sides N and N' perpendicular to the pair of sides O and O', a side P of the piezoelectric element in a lengthwise direction thereof is disposed along the side O, and wherein given that a length of a part of the side P of the piezoelectric element where the first electrode and the second electrode face each other is denoted by PL, a length of one side of the vibration plate in the direction along the side O is denoted by VL, a length of the side O of the optical effective region B is denoted by OL, a region positioned in one end portion of the piezoelectric element in a direction along the side O and spanning along the side P over a length b inwards from a line, which is an extension of the side N or N' of the optical effective region B and which intersects the piezoelectric element, is denoted by an near-end zone σ of the piezoelectric element, an absolute value of piezoelectric constant of the piezoelectric material in a region, which is positioned between two lines extending from the sides N and N' of the optical effective region B and which does not include the near-end zone σ, is denoted by d, and an absolute value of the piezoelectric constant in the near-end zone σ is denoted by $d_0$, relations of VL≥PL>OL and d>$d_0$ are satisfied, and the length b satisfies a relation of OL>b>0.

2. The dust removing device according to claim 1, wherein d and $d_0$ satisfy a relation of 0≤$d_0$≤0.95 d.

3. The dust removing device according to claim 1, wherein the length b satisfies 0.1×OL>b.

4. The dust removing device according to claim 1, wherein the piezoelectric material contains a perovskite metal oxide expressed by a following general formula (1);

$(Ba_{1-x}Ca_x)(Ti_{1-y}Zr_ySn_z)O_3$    (1)

(where 0.02≤x ≤0.30, 0.020 ≤y≤0.095, 0≤z≤0.04, and y≤x) and Mn, and a content of Mn is 0.02 weight part or more and 0.40 weight part or less in terms of metal with respect to 100 weight parts of the perovskite metal oxide.

5. A manufacturing method for a dust removing device including a vibration plate that includes an optical effective region B having a substantially right-angled quadrate shape and an outer region A positioned outside the optical effective region B, and piezoelectric elements each having a substantially rectangular parallelepiped shape and disposed on the surface of the vibration plate, the piezoelectric element including a piezoelectric material, a first electrode, and a second electrode, wherein the manufacturing method includes steps of:

fixing each piezoelectric element to the outer region A positioned outside the optical effective region B of the vibration plate such that, when four sides of the optical effective region B are denoted by a pair of sides O and O' and a pair of sides N and N' perpendicular to the pair of sides O and O', a side P of the piezoelectric element in a lengthwise direction thereof is disposed along the side O;

specifying, as an near-end zone σ of the piezoelectric element, a region positioned in one end portion of the piezoelectric element in a direction along the side O and spanning along the side P over a length b inwards from a line, which is an extension of the side N or N' of the optical effective region B and which intersects the piezoelectric element; and heat press-bonding an electric supply line, through which an AC voltage is supplied to the piezoelectric element, to the near-end zone σ while a relation of d>$d_0$ is satisfied where d denotes an absolute value of piezoelectric constant of the piezoelectric material in a region other than the near-end zone σ, and $d_0$ denotes an absolute value of the piezoelectric constant in the near-end zone σ.

6. An image pickup apparatus including the dust removing device according to claim 1, and an image pickup element, wherein the vibration plate of the dust removing device and a light receiving surface of the image pickup element are disposed in coaxial relation.

* * * * *